(12) United States Patent
Kim et al.

(10) Patent No.: US 11,994,666 B2
(45) Date of Patent: May 28, 2024

(54) OPTICAL BEAM ANGLE AND POSITION CONTROL SYSTEM

(71) Applicants: IonQ, Inc., College Park, MD (US); Duke University, Durham, NC (US)

(72) Inventors: Jungsang Kim, Chapel Hill, NC (US); Kai Hudek, Hyattsville, MD (US); Jaime David Wong-Campos, Hyattsville, MD (US)

(73) Assignees: IonQ, Inc., College Park, MD (US); DUKE UNIVERSITY, Durham, NC (US)

( * ) Notice: Subject to any disclaimer, the term of this patent is extended or adjusted under 35 U.S.C. 154(b) by 402 days.

(21) Appl. No.: 17/374,127

(22) Filed: Jul. 13, 2021

(65) Prior Publication Data

US 2022/0137390 A1 May 5, 2022

Related U.S. Application Data

(60) Provisional application No. 63/051,694, filed on Jul. 14, 2020.

(51) Int. Cl.
*G02B 23/12* (2006.01)
*G02B 23/02* (2006.01)
*G06N 10/00* (2022.01)

(52) U.S. Cl.
CPC ............ *G02B 23/12* (2013.01); *G02B 23/02* (2013.01); *G06N 10/00* (2019.01)

(58) Field of Classification Search
CPC .......... G02B 23/12; G02B 23/02; G06N 10/00
See application file for complete search history.

(56) References Cited

U.S. PATENT DOCUMENTS

2004/0119020 A1 * 6/2004 Bodkin ................ G01J 3/0208
250/353

FOREIGN PATENT DOCUMENTS

EP 3540501 A1 * 9/2019 .............. G02F 1/113

* cited by examiner

*Primary Examiner* — David P Porta
*Assistant Examiner* — Fani Polyzos Boosalis
(74) *Attorney, Agent, or Firm* — ARENTFOX SCHIFF LLP (57) ABSTRACT

Aspects of the present disclosure describe techniques for independently controlling an angle (e.g., change in tilt) and/or position (e.g., change in lateral position) of an optical beam. For example, an optical beam control system may include a telescope with rotatable mirrors and lenses configured to provide a path to an optical beam to produce an output optical beam, which in turn is made into parallel optical beams following a diffractive optical element. The optical beam control system may also include a detector system to a beam angle and/or a beam position of one of the parallel optical beams to generate feedback signal or signals to control a rotation of one or more of the mirrors in the telescope such as to adjust the beam angle, the beam position, or both of the parallel optical beams. The optical beam control system may be part of a quantum information processing (QIP) system.

19 Claims, 10 Drawing Sheets

OPTICAL BEAM ANGLE AND POSITION CONTROL SYSTEM

CROSS REFERENCE TO RELATED APPLICATIONS

The present application claims priority to and the benefit of U.S. Provisional Patent Application No. 63/051,695, entitled "OPTICAL BEAM ANGLE AND POSITION CONTROL SYSTEM," and filed on Jul. 14, 2020, the contents of which are incorporated herein by reference in their entirety.

BACKGROUND

Aspects of the present disclosure relate generally to controlling aspects of one or more optical beams, and more specifically, to techniques for controlling the position and/or angle of one or more optical beams.

There are many different types of systems that use optical beams in the operation of the system. Some of those systems may include quantum information processing (QIP) systems, for example. QIP systems, also referred to as quantum computing systems or more simply as quantum computers, may have different implementations. Trapped atoms are used in one of the leading implementations of QIP systems, with superconducting structures being used in other common implementations. Atomic-based qubits may be used as quantum memories, for quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

To properly program and perform quantum computations or quantum simulations (e.g., including the implementation and operation of quantum gates) using atomic-based qubits, precise control over the characteristics of optical beams used to interact with the qubits is important to reduce noise/error. In the optical systems used by the QIP systems to generate and propagate the optical beams, it may be sometimes difficult to precisely control the angle of incidence of the optical beam and the position or alignment of the optical beam, particularly when multiple such optical beams are needed to address multiple atomic-based qubits. The angle of the optical beam (or alternatively the beam angle) may be the incident angle of the optical beam on a particular target. Similarly, the position of the optical beam (or alternatively the beam position) may be the spatial position or offset of the optical beam on the target. Controlling the beam angle and/or the beam position may be important in the operations of optical systems, including those used in QIP systems. Therefore, improvements in such optical systems that provide better control of the beam angle and/or the beam position are desirable.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure involve providing some form of feedback control so that one or more optical beams (e.g., laser beams) are stably held at a location (e.g., at a defined plane or target), in terms of both a lateral position and an incident angle. Such control may be needed in the acousto-optic modulator (AOM) systems that are used to, for example, implement and operate quantum gates. The techniques described herein, while applicable to quantum information processing (QIP) systems or quantum computers, may also be useful in other applications in which the positioning and/or the angle of optical beams needs to be controlled.

In an aspect of this disclosure, an optical beam control system is described that includes a telescope having multiple rotatable mirrors and multiple lenses collectively configured to provide a path to an optical beam that is input into the telescope to produce an output optical beam, the output optical beam being made into parallel optical beams following a diffractive optical element. The optical beam control system also includes a detector system configured to detect a beam angle, a beam position, or both associated with one of the parallel optical beams being sampled to generate one or more feedback signals to control a rotation of one or more of the rotatable mirrors in the telescope to modify the path and thereby the output optical beam such as to adjust the beam angle, the beam position, or both of the parallel optical beams. The adjustment of the beam angle can be made independent or orthogonal from the adjustment of the beam position.

In certain aspects of the present disclosure, a QIP system is described for controlling quantum states of ions in an ion chain for quantum operations. The QIP system includes a trap configured to implement the ion chain and a multi-channel AOM configured to receive multiple parallel optical beams and modify one or more of the parallel optical beams for controlling respective ions in the ion chain. The QIP system also includes a telescope having multiple rotatable mirrors and multiple lenses collectively configured to provide a path to an optical beam that is input into the telescope to produce an output optical beam, the output optical beam being made into the parallel optical beams following a diffractive optical element. The QIP system also includes a detector system configured to detect a beam angle, a beam position, or both associated with one of the parallel optical beams being sampled to generate one or more feedback signals to control a rotation of one or more of the rotatable mirrors in the telescope to modify the path and thereby the output optical beam such as to adjust the beam angle, the beam position, or both of the parallel optical beams at the multi-channel AOM. The adjustment of the beam angle can be made independent or orthogonal from the adjustment of the beam position.

Another aspect of the present disclosure describes a method for controlling an optical beam in a QIP system using an optical beam control system. The optical beam control system has a telescope with multiple rotatable mirrors and multiple lenses, a diffractive optical lens, a zoom lens, a detector system having a first sensor and a second sensor, and a multi-channel AOM. The method includes receiving, at the telescope, an optical beam and producing an output optical beam from the optical beam by using a path collectively provided by the multiple rotatable mirrors and multiple lenses in the telescope. The method further includes generating parallel optical beams from the output optical by using the diffractive optical element and the zoom lens. The method further includes providing the parallel optical beams to the multi-channel AOM and detecting, from one of the parallel optical beams passing through the multi-channel AOM, a beam angle by the first sensor and a beam position by the second sensor. Additionally, the method includes generating, from information provided by the first sensor and the second sensor, one or more feedback signals to control a rotation of one or more of the rotatable mirrors in the telescope to modify the path and thereby the output optical beam such as to adjust the beam angle, the beam position, or both of the parallel optical beams at the multi-channel AOM. The adjustment of the beam angle can be made independent or orthogonal from the adjustment of the beam position.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form to avoid obscuring such concepts.

The present disclosure involves providing some form of independent feedback or correction control so that one or more optical beams (e.g., laser beams) are stably held at a location (e.g., at a defined plane or target), in terms of lateral position, incident angle, or both. These techniques may be needed in the types of AOM systems that are used along with optical beams to control atomic qubits to implement and operate quantum gates. These techniques, however, may also be useful in other applications in which the positioning and/or the angle of optical beams is critical for operation.

Figure 1:
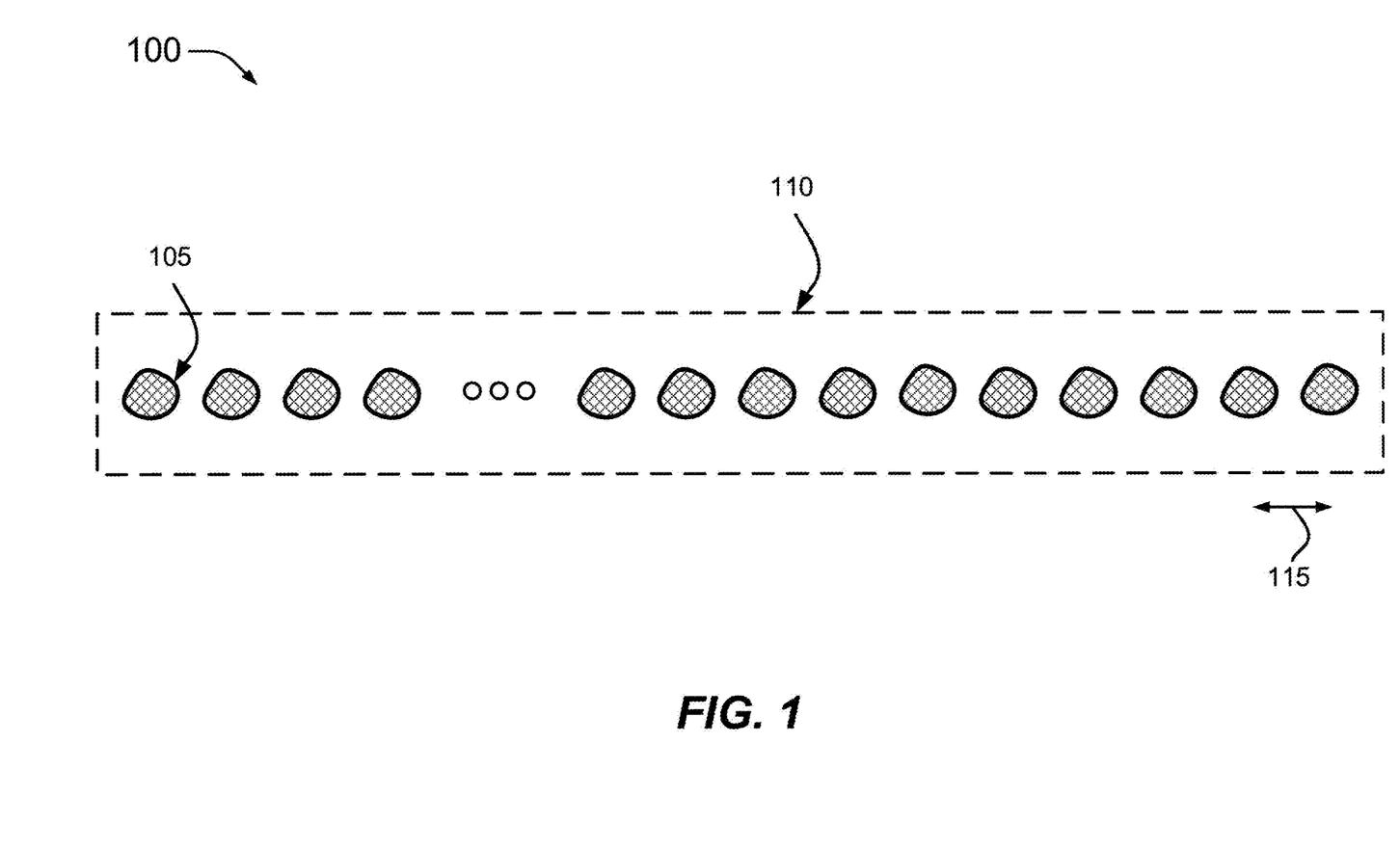
FIG. 1 illustrates a diagram of multiple atomic ions trapped in a linear crystal or chain using an ion trap according to some aspects of the present disclosure.

As described above, trapped atoms (also referred to as trapped atomic ions, trapped ions, atomics ions, or simply ions) may be used to implement qubits in QIP systems or quantum computers. FIG. 1 shows a diagram 100 that illustrates multiple ions 105 trapped to form a chain 110 using an ion trap (not shown). In one example, the ion trap is in a vacuum chamber in a quantum system and is used to trap multiple (e.g., N>1, with some implementation having N=32) Ytterbium ions (e.g., $^{171}\text{Yb}^+$ ions) which are confined in the chain 110 and are laser-cooled to be nearly at rest. Other atomic species or isotopes may also be used. The number of ions trapped can be configurable and more or fewer atomic ions may be trapped. In this example, the ions are separated by a distance 115 of about 5 microns (μm) from each other as shown by fluorescence.

Figure 2:
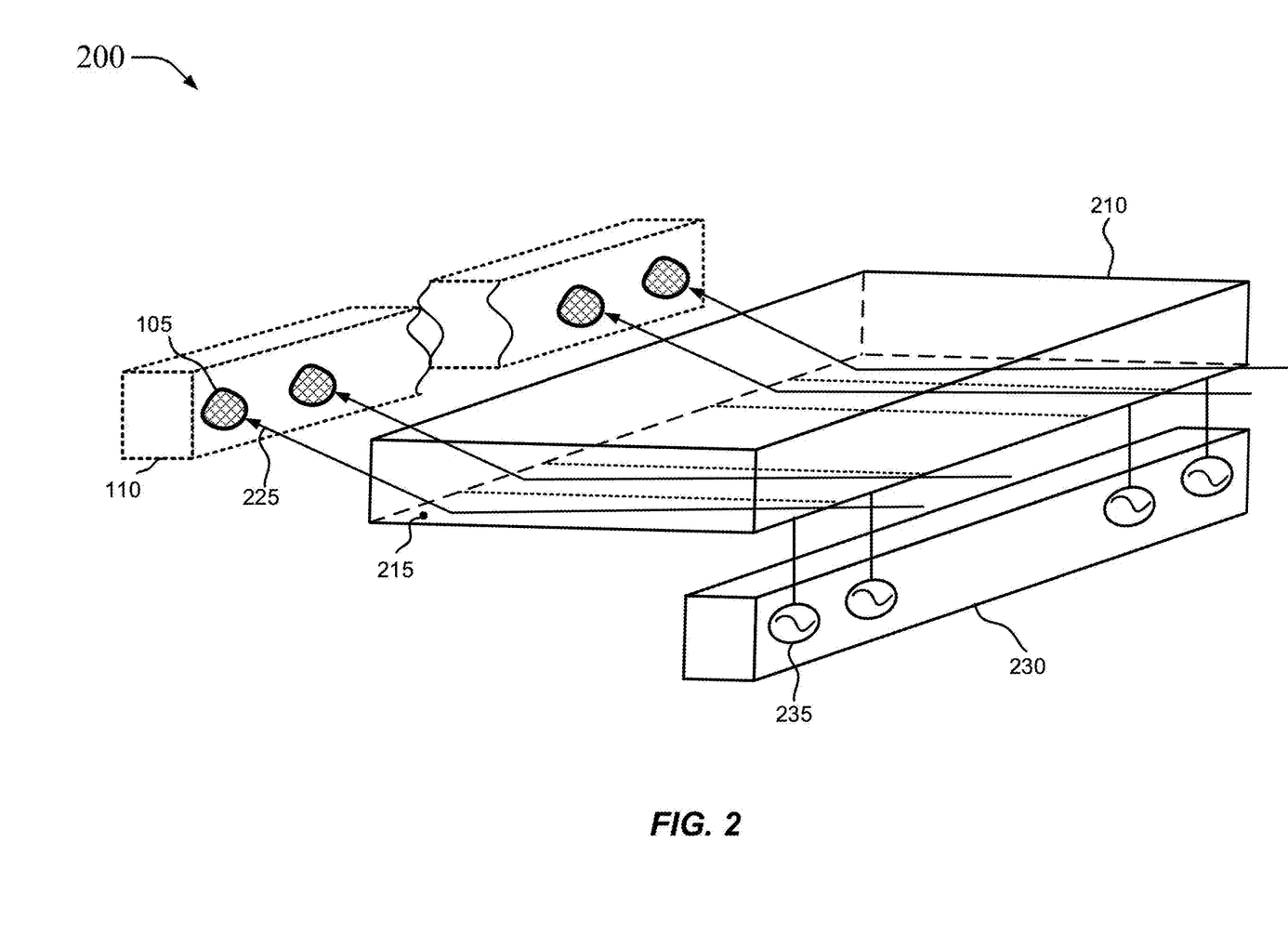
FIG. 2 illustrates a diagram of a multi-channel AOM to address the trapped ion in the ion trap according to some aspects of the present disclosure.

To perform quantum computations or simulations, the ions 105 may be controlled or addressed with optical beams (e.g., laser beams), where for each of the ions 105 one or more optical beams may be used. FIG. 2 shows an illustration of a system 200 that is used for controlling multiple qubits with a multi-channel AOM 210. The system 200 includes the chain 110 with the ions 105 shown in the diagram 100 in FIG. 1, which may be illuminated by the individual addressing optical beams 225 from one direction. In some instances, a global optical beam (not shown) may be used to illuminate the ions 105 from a different or opposite direction to that of the optical beams 225. The multi-channel AOM 210 may be a multi-channel Bragg cell having multiple piezo-electric transducers 215 (e.g., in a parallel arrangement) that locally apply acoustic waves to the AOM 210, where each channel has its own piezo-electric transducer 215. The AOM 210 may include a different channel for each of the ions 105. In some instances, the AOM 210 may include one or more additional channels to the ones needed for the ions 105. The piezo-electric transducers 215 may be controlled by a controller 230 having waveform generators 235. The waveform generators 235 may be arbitrary waveform generators (AWGs) and/or direct digital synthesizers, or some other type of signal generating device.

In order to accurately perform the quantum computations or simulations, it is important to have good control of the beam position, for example, the spatial location of the optical beams 225 as they impinge on a target (e.g., the AOM 210). It is also important to have good control of the beam angle of the optical beams 225 as they impinge on the target (e.g., the AOM 210). For example, the beam angle may refer to an incident angle relative to an axis normal to the surface of the target. Accordingly, angle and/or position control optics are needed to control the optical beams 225 that are provided to the AOM 210 and that are used to address the ions 105.

It is to be understood that an optical beam (e.g., optical beams 225) need not be provided directly from a source and there may be intermediate optical and/or optoelectronic elements between the source and the AOM 210. A general implementation of the angle and position control optics can make repeated use of conjugate optics arrangements to achieve independent or orthogonal control of the angle and the position of one or multiple optical beams 225.

Figure 3:
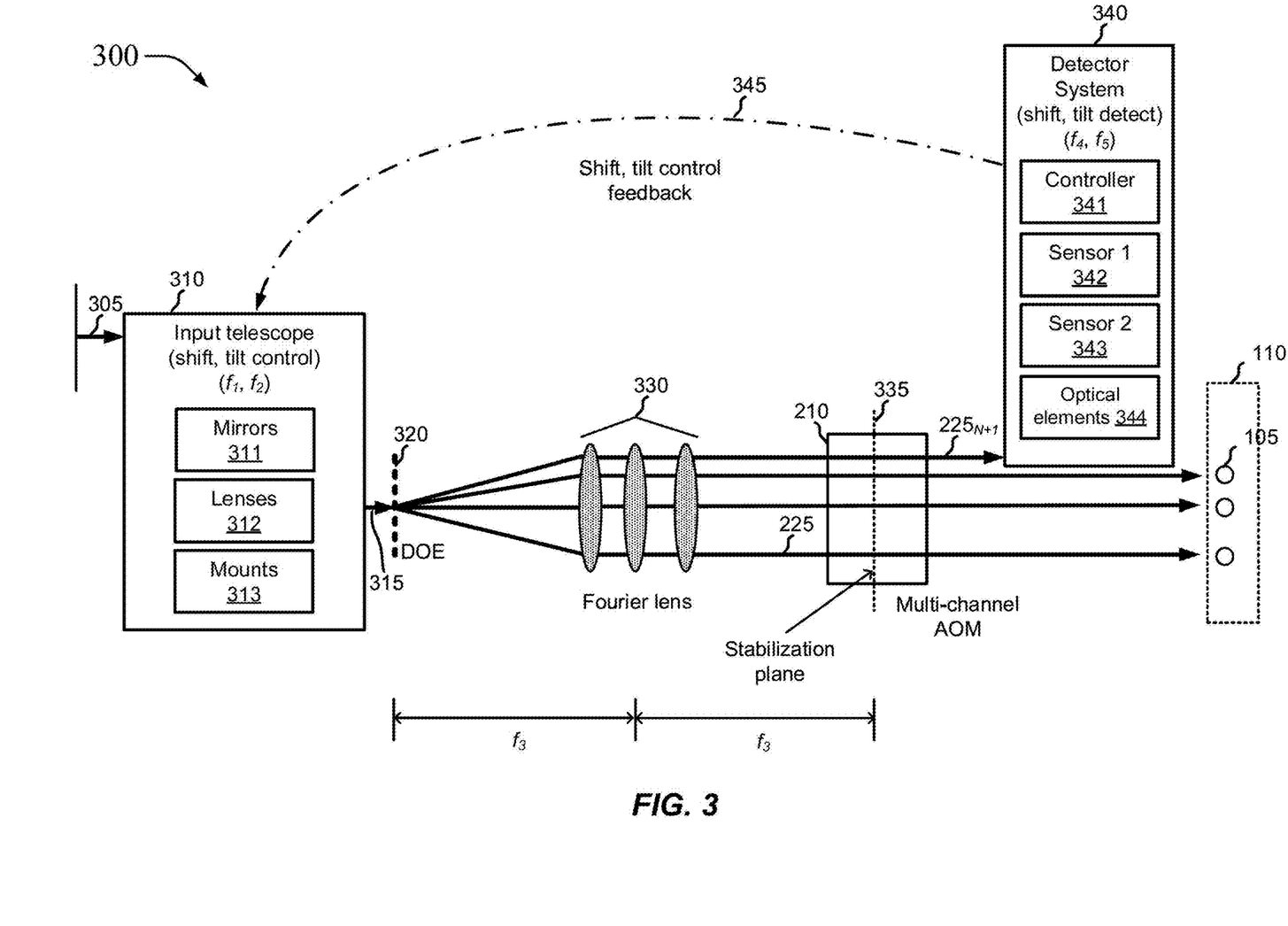
FIG. 3 illustrates a diagram of an angle and position control system to control optical beams incident on the multi-channel AOM according to some aspects of the present disclosure.

FIG. 3 illustrates a diagram 300 that describes aspects of an angle and position control system to control optical beams incident on a multi-channel AOM according to aspects of the present disclosure. The angle and position control system is configured to allow for independent or orthogonal control of the angle and the position of optical beams. It is to be understood that some of the sizes, angles, optical beam waists, and other physical characteristics provided in connection with the diagram 300 are provided by way of illustration and not of limitation.

Shown in the diagram 300 are an input optical beam 305 (e.g., from a laser source) that is provided into an input telescope or optical system 310 to produce an output optical beam 315 that is provided to a diffractive optical element (DOE) 320. Multiple optical beams 225 are generated by the DOE 320 and are provided to a Fourier lens 330 (e.g., with focal length $f_3$) for parallelization. The Fourier lens 330 may also be referred to as a zoom lens. Once parallelized, the optical beams 225 are provided to, for example, the multi-channel AOM 210 to individually control the optical beams 225 used to address the ions 105 in the chain 110. At least one of the optical beams 225 (e.g., the optical beam $225_{N+1}$) is provided to a detector system 340 for sampling, that is, to detect if the optical beam is in the correct position (e.g., lateral position in the AOM 210) and/or is incident with the correct angle (e.g., angle of incidence onto the AOM 210). The detector system 340 may generate a feedback signal 345 (or multiple feedback signals) that is provided to the input telescope 310 to make any adjustments or modifications necessary to the output optical beam 315 so that the parallel optical beams 225 arrive at the AOM 210 with the correct position and/or angle.

The input telescope 310 may include multiple rotatable mirrors 311, multiple lenses 312, and multiple mounts (e.g., piezo mirror mounts) 313. In one example, the input telescope 310 includes two rotatable mirrors, two fixed lenses (e.g., with focal lengths $f_1$ and $f_2$), and two piezo mirror mounts that receive the feedback signal 345 to adjust a position of the mirrors. The feedback signal 345 may include information to control a rotation (e.g., tilt, swivel, twist) of one of the two rotatable mirrors and/or information to control a rotation of the other one of the two rotatable mirrors.

The detector system 340 may include a controller 341, a sensor 1 342, a sensor 2 343, and optical elements 344. In one example, the optical elements (e.g., lenses with focal lengths $f_4$ and $f_5$, mirrors, beam splitter) are used to direct the optical beam $225_{N+1}$ to the sensor 1 342 and the sensor 2 343 to detect an angle/tilt and a position/shift of the optical beam, respectively. The controller 341 receives information from the sensors and generates the feedback signal 345 based on that information.

In the diagram 300, a stabilization plane 335 is defined to be at the middle of the AOM 210. The stabilization plane 335 may be a plane or location at which it is desired to have one or more optical beams (e.g., laser beams) stably held in terms of lateral position, incident angle, or both. A Fourier lens (with an effective focal length of $f_3$) is needed that converts the diverging optical beams from the DOE 320 to parallel beams into the AOM 210. The focal length of this lens is determined by the angular divergence between neighboring beams from the DOE 320 and the separation between the channels of the AOM 210. In one example, the angular divergence is $\theta_0=0.075$ degrees and the separation between the channels in the AOM 210 is $\Delta=450$ µm. This determines the focal length $f_3$ to be $$f_3 = \frac{\Delta}{\theta_0} = \frac{0.45 \text{ mm}}{0.075 \text{ deg}} \times \frac{180 \text{ deg}}{\pi \text{ rad}} = 344 \text{ mm}.$$

A lens (e.g., a Fourier lens 330) with multiple optical elements may be used to provide the desirable focal length of $f_3$ and a telecentric performance at the stabilization plane 335 in the AOM 210.

It is desirable to manipulate the beam waist of the optical beams. A telescope with magnification other than 1 accomplishes such manipulation. The input telescope 310 provides the functionality of an expanding telescope and therefore can be used to manipulate optical beams.

Figure 4:
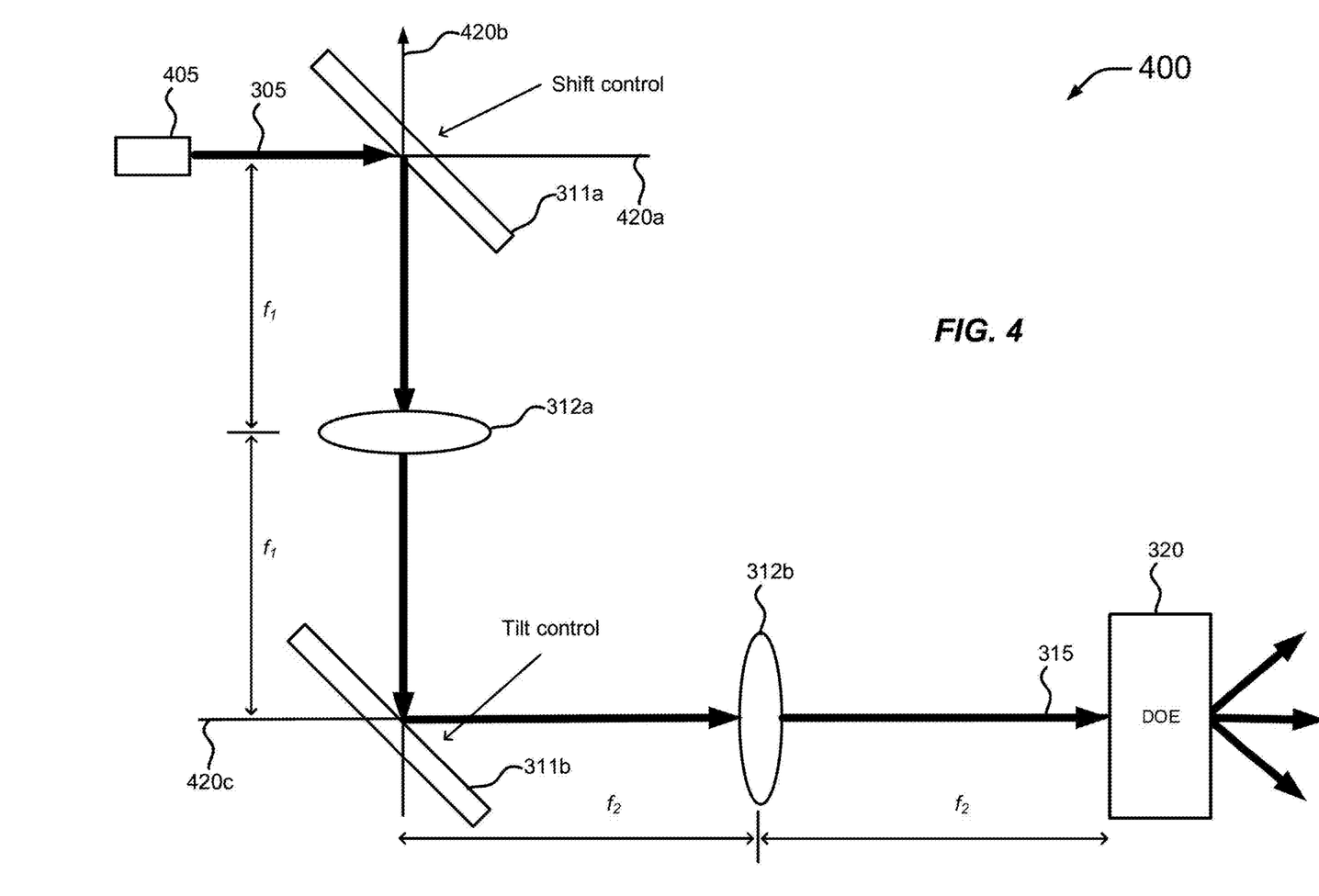
FIG. 4 illustrates a diagram of an input telescope according to some aspects of the present disclosure.

FIG. 4 shows a diagram 400 with an example implementation of the input telescope 310. In this example, the input telescope 310 includes a first rotatable mirror 311a (or simply the first mirror 311a), a second rotatable mirror 311b (or simply the second mirror 311b), a first lens 312a having a focal length $f_1$, and a second lens 312b having a focal length $f_2$. Although not shown, each of the mirrors may have a corresponding mount (e.g., a piezo mirror mount) that is electrically controllable to change an angle, rotation, twist, or swivel of the respective mirror. The first mirror 311a is positioned and rotates about the intersection of an axis 420a and an axis 420b, and the second mirror 311b is positioned and rotates about the intersection of the axis 420b and an axis 420c. For example, each of the mirrors can rotate or swivel in one or more dimensions, such as about the plane of the diagram 400, about a plane orthogonal to the plane of the diagram 400, or a combination.

Also shown in the diagram 400 are a source 405 (e.g., a laser source) of the input optical beam 305, the output optical beam 315, and the DOE 320 to which the output optical beam 315 is provided. It is to be understood that the input optical beam 305 need not be provided directly from the source 405 to the first mirror 311a and there may be intermediate optical and/or optoelectronic elements between the source 405 and the first mirror 311a. As mentioned above, the angle and position control system described in the diagram 300, which includes the input telescope 310 in the diagram 400, may be provided before the AOM 210.

In an example, $f_1$ and $f_2$ may be used to realize an input telescope with a magnification of $M=f_2/f_1$, which may be used to compensate for differences in the sizes of optical beam waists. It is to be understood that different combinations of lenses can be chosen to realize a similar effect. By using convex lenses for the first lens 312a and the second lens 312b it is possible to realize an input telescope with two conjugate points to place tilting mirrors to control the position and angle of the optical beams 225 that are produced from the output optical beam 315.

Regarding the position or shift control of the optical beams 225, the first mirror 311a is configured to rotate (e.g., in one or more dimensions) to change the angle of the optical beam incident on the DOE 320 (e.g., the output optical beam 315). The DOE 320 is at the imaging point of the input telescope, which means that a tilt at this point will shift the optical beam 225 at the stabilization plane 335. Regarding the position or shift control of the optical beams 225, the angular tilt $\Delta\theta_1$ of this control mirror (e.g., the first mirror 311a) is related to a lateral or positional shift of $\Delta x_1$ at the stabilization plane 335 by the following relationship:

$$\Delta x_1 = \Delta\theta_1 \times \frac{f_3}{M}.$$

The lateral shift $\Delta x_1$ that occurs for the optical beam 225 at the stabilization plane 335 can be measured using the detector system 340 described above. Additional details regarding an example of the detector system 340 are provided below in connection with FIG. 5A.

In an example, where the number of ions 105 is N=32, it is possible to generate at least 33 optical beams 225 and use the 33$^{rd}$ optical beam 225 (e.g., the optical beam 225$_{N+1}$) to make the lateral shift measurement and keep the other 32 optical beams 225 to individually address the 32 ions 105. In such an example, the lateral shift of the optical beams 225 may be measured or sampled at the stabilization plane 335 by tapping the 33rd optical beam and creating a 2$f$-2$f$ imaging system. In the example shown in FIG. 5A, this is done using the single lens 344c with the focal length associated with $f_5$ (e.g., $f_5$=100 mm). In such a configuration, the 2$f$-2$f$ imaging system is an imaging system with a magnification of 1. By having the sensor 2 343 be a position sensitive detector with a position resolution of ~1 μm, it is possible to sense the position shift of the optical beam 225 being sampled at the AOM 210 to within 1 μm, for example. In order to control the optical beam position to this accuracy, an angular control resolution of about ~3 μrad for M~1 is needed at the respective mirror, according to this relationship. In this example, the shift or positioning information collected by the sensor 2 343 may be used by the controller 341 to generate the feedback signal 345 that is provided to the input telescope 310. More particularly, the controller 341 may generate a feedback signal 345b (see FIG. 5A) from the sensor 2 343 that is provided to the respective mirror (or to a mount controlling the rotation of the mirror). As mentioned above, rather than having a separate feedback signal, it is possible to have a single feedback signal that includes different types of feedback information. In such a case, the feedback signal 345b may be considered to be a portion of the feedback signal 345 with information for position or shift control.

Returning to FIG. 4 and the diagram 400, regarding the angle or tilt control of the optical beams 225, the tilt (e.g., in one or more dimensions) of the second mirror 311b changes the angle of the optical beams 225 at the stabilization plane 335. In a non-limiting example, the combination of the second lens 312b (with focal length $f_2$) and the Fourier lens 330 (with focal length $f_3$) form a telescope with a magnification of M'=$f_3/f_2$, and corresponding angular magnification of 1/M'. This angular shift can be detected by the detector system 340 (e.g., a PSD detector) shown in FIG. 5A.

Figure 5A:
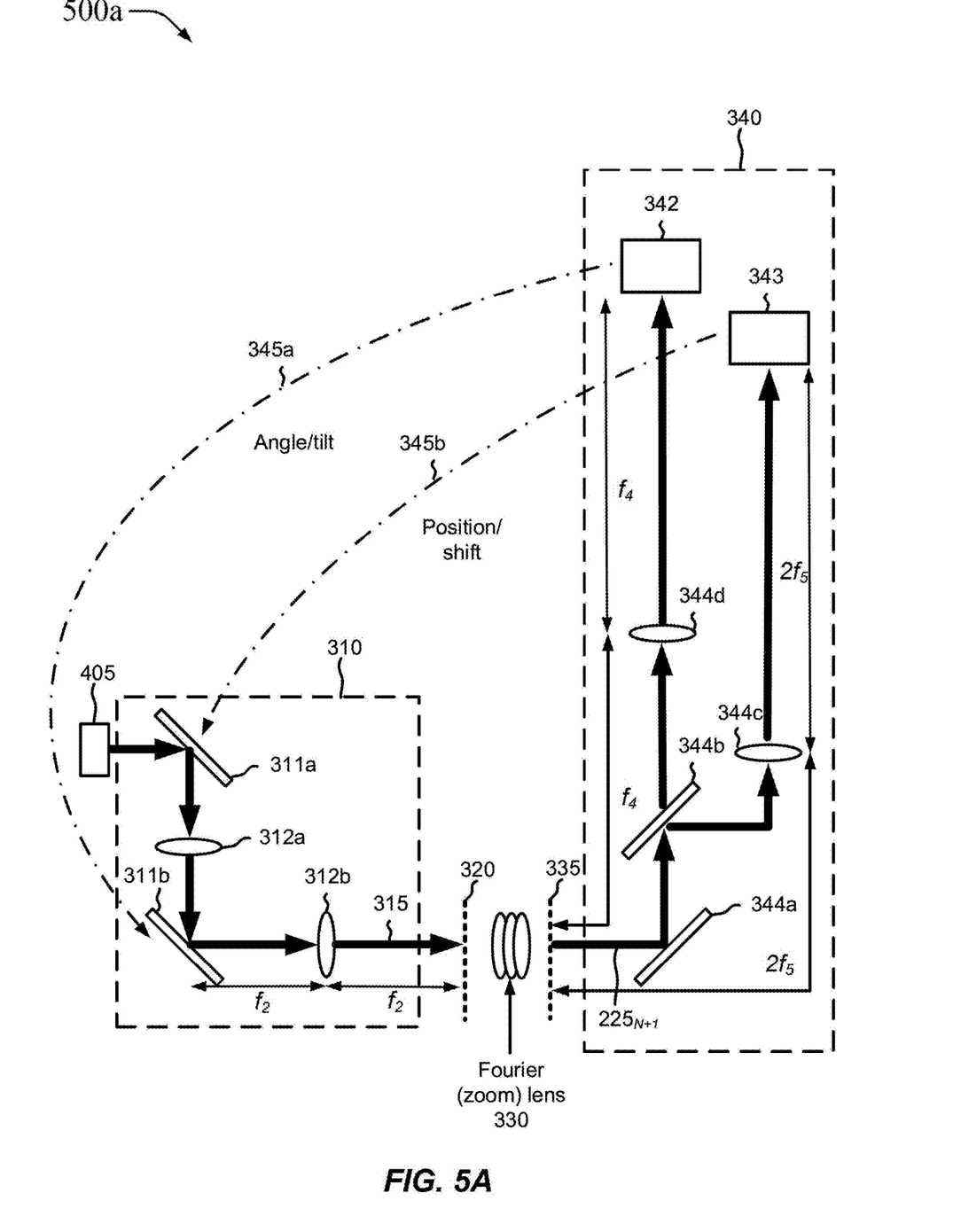
FIG. 5A illustrates a diagram of a detector system according to some aspects of the present disclosure.

FIG. 5A shows a diagram 500a that includes one possible implementation of the detector system 340 for measuring or detecting the lateral shift in the position of an optical beam. The detector system 340 is shown having the sensor 1 342 and the sensor 2 343, each of which can be a position sensitive detector or PSD. Also, part of the detector system 340, and more specifically part of the optical elements 344, are a mirror 344a, a beam splitter 344b, the first lens 344c with associated focal length (e.g., related to $f_5$) and used with the sensor 2 343, and a second lens 344d with focal length $f_4$ and used with the sensor 1 342.

At the output optical beam 315 produced by the input telescope 310, and at the stabilization plane 335, the effect of the position/shift and angle/tilt controls is swapped. Therefore, in the example shown in FIG. 5A, for the feedback paths 345a and 345b to be going to the correct mirror mounts, the Fourier or zoom lens 330 needs to be present.

The detector 340 can detect the angular shift or tilt by converting the angular shift into a position shift using another Fourier lens—in this case the lens 344d with focal length $f_4$ and located a distance $f_4$ away from the stabilization plane 335. In an example, the focal length $f_4$ can be chosen to be $f_4$=200 mm. With the sensor 1 342 being a position sensitive detector with a resolution of ~1 μm, this corresponds to the detection of an angular change $\Delta\theta_2$ at the stabilization plane 335 of $$\Delta\theta_2 = \frac{1\ \mu m}{200\ mm} = 5\ \mu rad.$$

To enable this level of change, the angular control required at the second mirror 311b in the input telescope 310 is 5 μrad×M'. For M'~1 this is about a factor of 10 less sensitive compared to the shift control mirror (e.g., the first mirror 311a) to enable a 1 μm shift control. In this example, the shift or positioning information collected by the sensor 1 342 may be used by the controller 341 (not shown) to generate the feedback signal 345 that is provided to the input telescope 310. More particularly, the controller 341 may generate a feedback signal 345a from the sensor 1 342 that is provided to the second mirror 311b (or to a mount controlling the rotation of the second mirror 311b). As mentioned above, rather than having a separate feedback signal, it is possible to have a single feedback signal that includes different types of feedback information. In such a case, the feedback signal 345a may be a portion of the feedback signal 345 with information for tilt control.

In some implementations, the sensor 1 342 and the sensor 2 343 may directly control the rotations of the first mirror 311a and the second mirror 311b (e.g., may directly generate the feedback signal(s)) and a separate controller may not be needed.

Various techniques and systems for stabilizing the angle and position of the optical beams 225 in the AOM 210 can be implemented using the optical designs described herein. The optical designs rely on the various lenses sitting on the conjugate points, which is a relatively straightforward alignment process. Using piezo mirror mounts (e.g., piezo motor actuated absolute positioning mirror mount), an angular control of 0.7 μrad seems feasible, and thus most implementations may be possible by using off-the-shelf position sensitive detectors and kinematic mounts. In one implementation, it is possible to have an open loop motor as part of the feedback. One option is to have both piezo motor mirrors for automated adjustment and piezo mirrors for closed loop feedback. The piezo motor mirrors, for example, can have a full range of 1.5 degrees with a minimum incremental motion of 15 mrad, while the piezo mirrors, for example, can have a full range of 500 mrad and a resolution of 0.5 mrad/100 mV. Different vendors may be used for the piezo mirror mounts, the piezo motor mirrors, and/or the piezo mirrors.

Figure 5B:
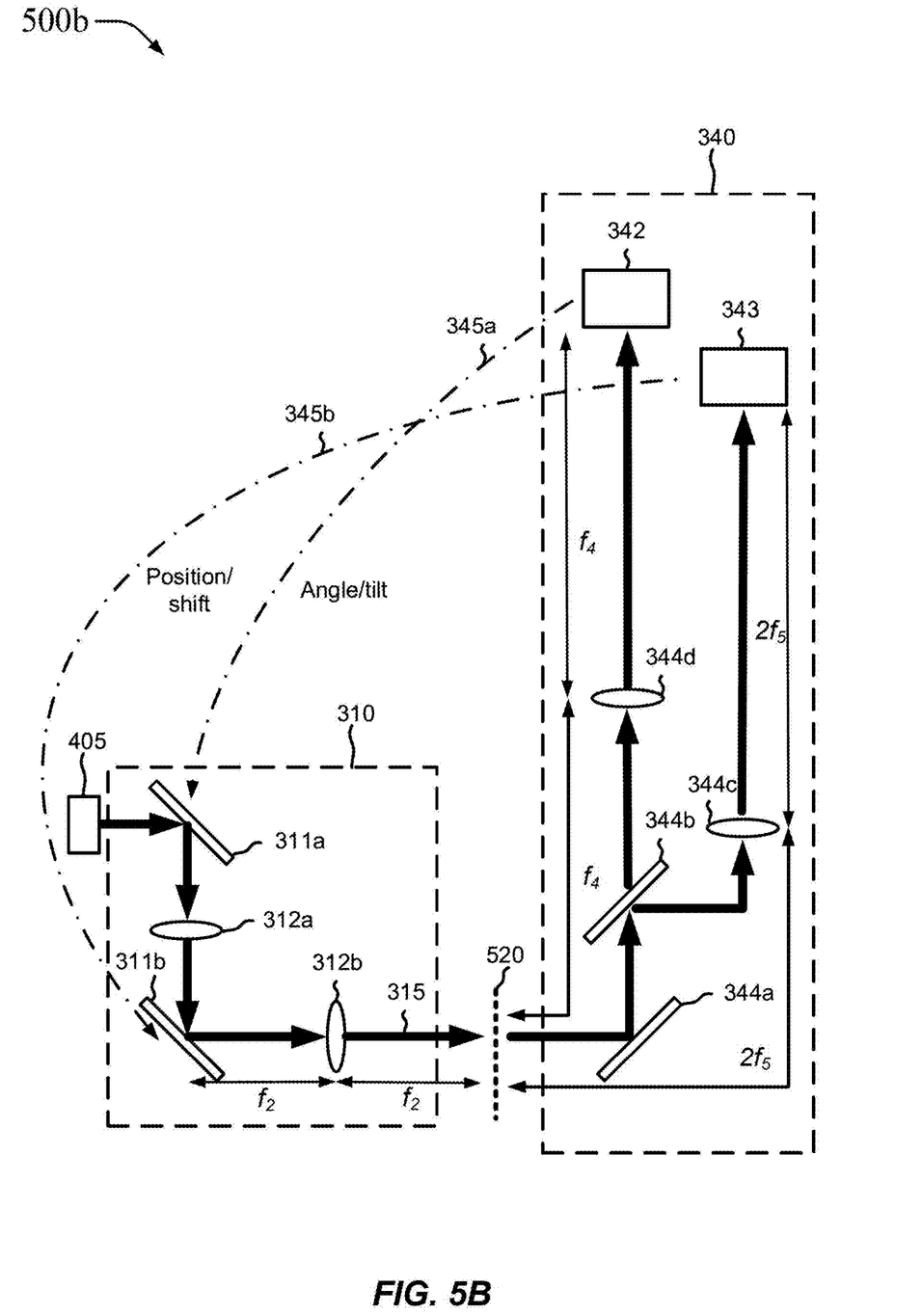
FIG. 5B illustrates a diagram of an alternative arrangement of the input telescope and the detector system according to some aspects of the present disclosure.

In an alternative to the diagram 500a in FIG. 5A, a diagram 500b in FIG. 5B illustrates a simplified arrangement in which the output optical beam 315 produced by the input telescope 310 is provided to a plane 520 from which the detector system 340 receives an optical beam for measuring or detecting errors or variations in the optical beam position (shift) and/or the optical beam angle (tilt). In this example, the Fourier lens 330 is not present and the correction to the appropriate mirrors because of the swapping effect of the position/shift and angle/tilt controls that is described above in connection with the diagram 500a does not occur. Accordingly, in the diagram 500b, the feedback signals 345a and 345b are swapped. The plane 520 may represent a stabilization plane or other type of plane in a system where independent and accurate control of one or both of incident angle and position of one or more optical beams is necessary.

Figure 6:
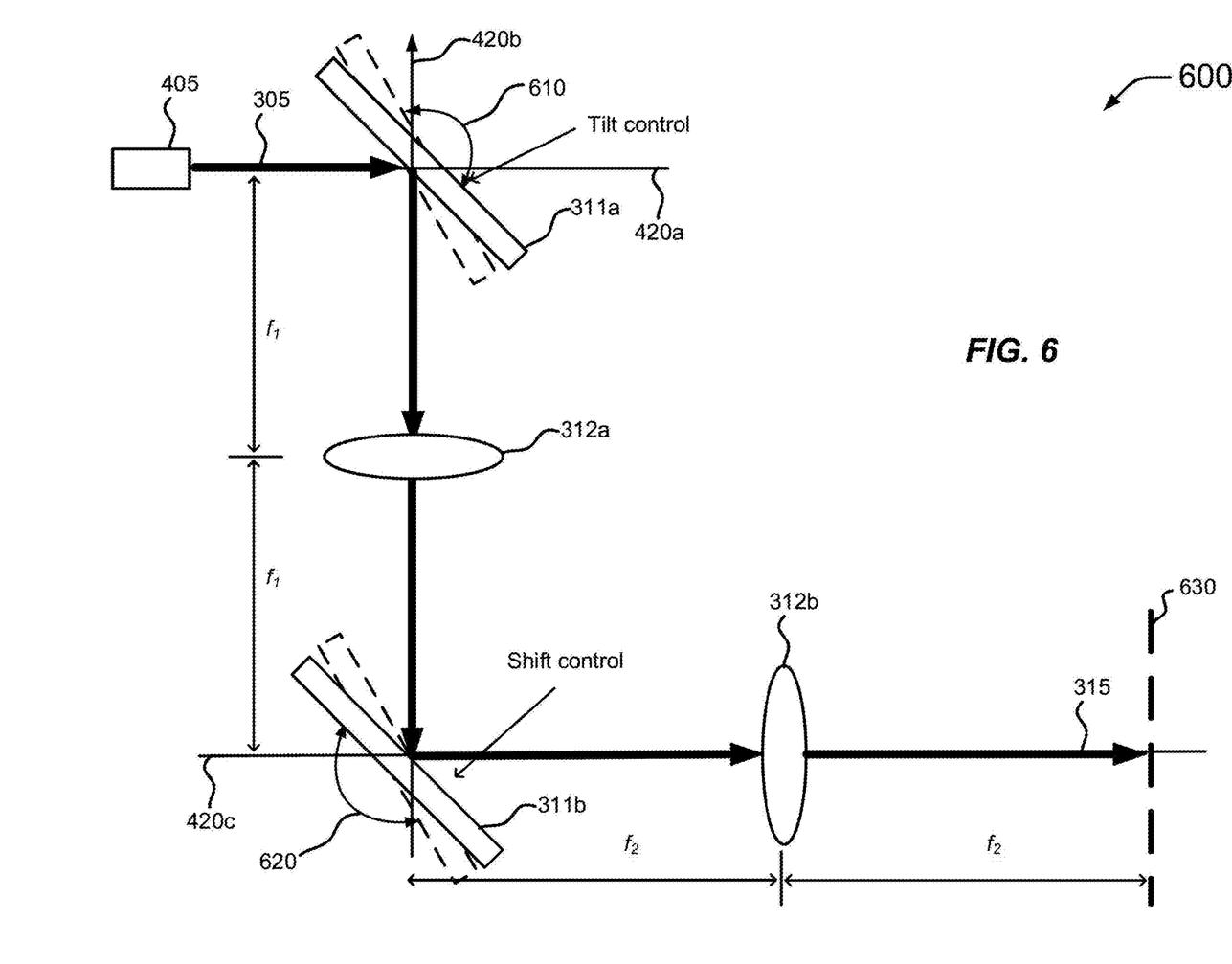
FIG. 6 illustrates a diagram of the operation of an input telescope according to some aspects of the present disclosure.

FIG. 6 shows a diagram 600 that describes aspects of the operation of the input telescope 310 described above in connection with the diagram 300 in FIG. 3. In this example, the first mirror 311a is operated independently from the second mirror 311b, although both mirrors can be operated concurrently or simultaneously. Moreover, the output optical beam 315 is provided to a general plane 630, which may correspond to the DOE 320 or to some other optical or optoelectronic device.

The rotation of the first mirror 311a (e.g., in one or more directions) for correcting or adjusting the tilt of the optical beams 225 may be independently controlled by one feedback signal (e.g., the feedback signal 345a) or by an independent portion of a global feedback signal (e.g., the feedback signal 345) applied to a mirror mount holding the first mirror 311a. Similarly, the rotation of the second mirror 311b (e.g., in one or more directions) for correcting or adjusting the shift of the optical beams 225 may be independently controlled by one feedback signal (e.g., the feedback signal 345b) or by an independent portion of a global feedback signal (e.g., the feedback signal 345) applied to a mirror mount holding the second mirror 311b.

In this example, the first mirror 311a can be rotated, tilted, twisted, or swiveled (e.g., rotation 610) from a first position (solid line) to a second position (dashed line), or from the second position to the first position, to adjust the incident angle of the optical beams 225. The second mirror 311a can be rotated, tilted, twisted, or swiveled (e.g., rotation 620) from a first position (solid line) to a second position (dashed line), from the second position to the first position, to adjust a lateral position of the optical beams 225.

The techniques described above with respect to FIGS. 3-6 are based on the ability to control (e.g., via a detection/measurement and a feedback mechanism) the angle and the position of optical beams at a particular location (e.g., the stabilization plane 335 in the AOM 210) by using the optical system in the input telescope 310, where this optical system is based on (1) how the angular tilt of an optical beam at the front focal plane of a lens translates to a lateral shift at the back focal plane of the lens and (2) how a lateral shift of an optical beam at the front focal plane of a lens translates to a (converging) angular tilt towards a focal point at the back focal plane of the lens. This individual control allows for the detector system 340 to generate one or more "error signals" or "error correction signals" in the form of feedback signals that indicate how much optical beam control is needed to bring the one or more optical beams back to a target position and/or a target angle. Moreover, the detection and correction of the optical beam position is performed separate and independent from the detection and correction of the optical beam angle, allowing flexibility in the overall angle and position control.

Figure 7:
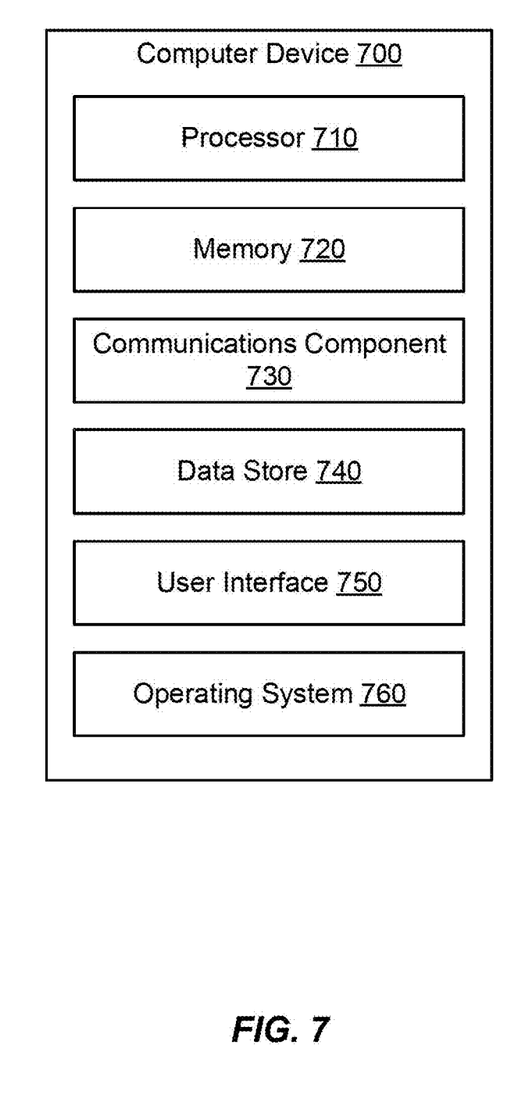
FIG. 7 is a diagram that illustrates an example of a computer device according to some aspects of the present disclosure.

Referring now to FIG. 7, illustrated is an example computer device 700 in accordance with aspects of the disclosure. The computer device 700 may represent a single computer device, multiple computer devices, or a distributed computing system, for example. The computer device 700 may be configured as a quantum computer (e.g., a quantum information processing (QIP) system), a classical computer, or a combination of quantum and classical computing functions. For example, the computer device 700 may be used to process information using quantum algorithms based on trapped ion technology and may therefore implement methods for independent control of the angle (e.g., tilt) and the position (e.g., shift) of optical beams used to interact with the trapped ions. A generic example of the computer device 700 as a QIP system that may implement an angle and position control system is illustrated in an example shown in FIG. 8.

In one example, the computer device 700 may include a processor 710 for carrying out processing functions associated with one or more of the features described herein. The processor 710 may include a single or multiple set of processors or multi-core processors. Moreover, the processor 710 may be implemented as an integrated processing system and/or a distributed processing system. The processor 810 may include a central processing unit (CPU), a quantum processing unit (QPU), a graphics processing unit (GPU), or combination of those types of processors. When combining different types of processors, the processor 710 may be referred to as a hybrid processor. For example, a hybrid processor may perform classical (e.g., GPU, CPU) operations along with quantum (e.g., QPU) operations. In one aspect, the processor 710 may refer to a general processor of the computer device 700, which may also include additional processors 710 to perform more specific functions such as functions for controlling the angle and/or the position of one or more optical beams.

In an example, the computer device 700 may include a memory 720 for storing instructions executable by the processor 710 for carrying out the functions described herein. In an implementation, for example, the memory 720 may correspond to a computer-readable storage medium that stores code or instructions to perform one or more of the functions or operations described herein. In one example, the memory 720 may include instructions to perform aspects of a method 900 described below in connection with FIG. 9. Just like the processor 710, the memory 720 may refer to a general memory of the computer device 700, which may also include additional memories 720 to store instructions and/or data for more specific functions such as instructions and/or data for controlling the angle and/or the position of one or more optical beams.

Further, the computer device 800 may include a communications component 730 that provides for establishing and maintaining communications with one or more parties utilizing hardware, software, and services as described herein. The communications component 730 may carry communications between components on the computer device 700, as well as between the computer device 700 and external devices, such as devices located across a communications network and/or devices serially or locally connected to computer device 700. For example, the communications component 730 may include one or more buses, and may further include transmit chain components and receive chain components associated with a transmitter and receiver, respectively, operable for interfacing with external devices.

Additionally, the computer device 700 may include a data store 740, which may be any suitable combination of hardware and/or software, that provides for mass storage of information, databases, and programs employed in connection with implementations described herein. For example, the data store 740 may be a data repository for operating system 760 (e.g., classical OS, or quantum OS). In one implementation, the data store 740 may include the memory 720.

The computer device 700 may also include a user interface component 750 operable to receive inputs from a user of the computer device 700 and further operable to generate outputs for presentation to the user or to provide to a different system (directly or indirectly). The user interface component 750 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 750 may include one or more output devices, including but not limited to a display, a speaker, a haptic feedback mechanism, a printer, any other mechanism capable of presenting an output to a user, or any combination thereof.

In an implementation, the user interface component 750 may transmit and/or receive messages corresponding to the operation of the operating system 760. In addition, the processor 710 may execute the operating system 760 and/or applications or programs, and the memory 720 or the data store 740 may store them.

When the computer device 700 is implemented as part of a cloud-based infrastructure solution, the user interface component 750 may be used to allow a user of the cloud-based infrastructure solution to remotely interact with the computer device 700.

Figure 8:
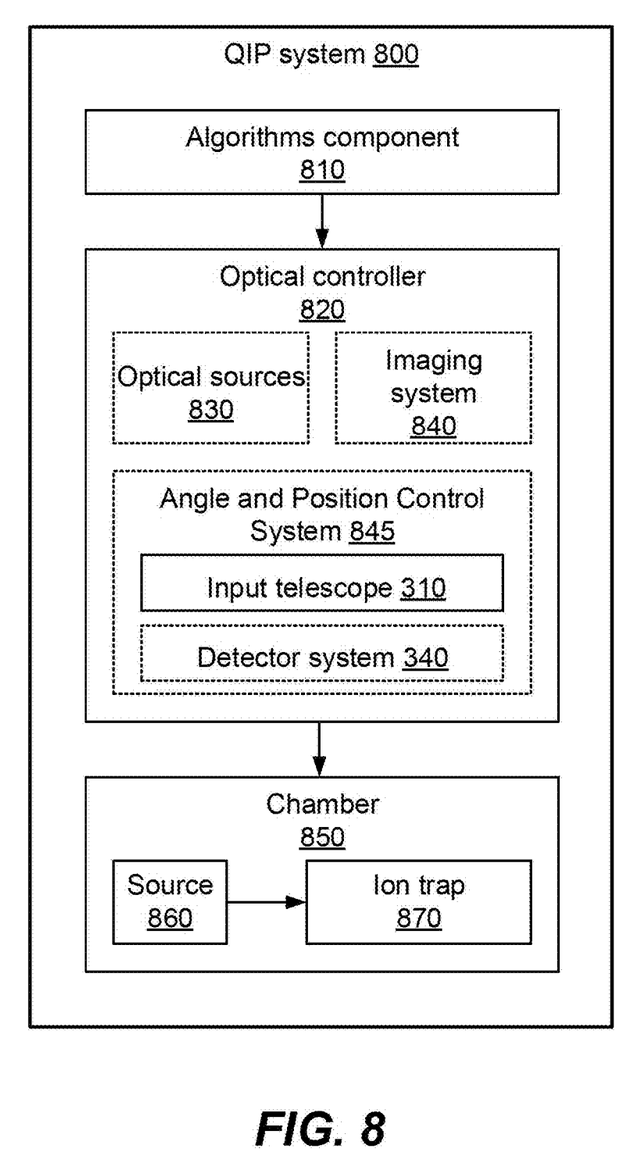
FIG. 8 is a block diagram that illustrates an example of a quantum information processing (QIP) system according to some aspects of the present disclosure.

FIG. 8 is a block diagram illustrating an example of a QIP system 800 in accordance with aspects of this disclosure. The QIP system 800 may also be referred to as a quantum computing system, a computer device, a trapped ion system, a trapped ion quantum computer, or the like. In an aspect, the QIP system 800 may be configured to perform quantum computations and quantum experiments. Moreover, the QIP system 800 may be configured to perform individual, separate control of the angle and the position of various optical beams used in the system.

The QIP system 800 can include a source 860 that provides atomic species (e.g., a flux of neutral atoms) to a chamber 850 having an ion trap 870 that traps the atomic species once ionized (e.g., photoionized) by an optical controller 820. The ion trap 870 may be used to trap ions into a linear array such as the chain 110 described above in connection with the diagram 100 in FIG. 1. The ion trap 870 may be considered to be a trapped ion processor or part of one. Optical sources 830 in the optical controller 820 may include one or more laser sources (e.g., sources of optical or laser beams) that can be used for ionization of the atomic species, control of the atomic ions, or fluorescence of the atomic ions that can be monitored and tracked by image processing algorithms operating in an imaging system 840 in the optical controller 820. The optical sources 830 may be configured to control and generate a linear array of laser or optical beams to perform parallel operations on the ions of the chain in the ion trap 870. In an aspect, the optical sources 830 may be implemented separately from the optical controller 820.

The imaging system 840 can include a high-resolution imager (e.g., CCD camera) for monitoring the atoms while they are being provided to the ion trap 870 and/or the atoms after they have been provided to the ion trap 870 and photoionized. In an aspect, the imaging system 840 can be implemented separate from the optical controller 820, however, the use of fluorescence to detect, identify, label, and/or control atomic ions using image processing algorithms may need to be coordinated with the optical controller 820.

The QIP system 800 may also include an algorithms component 810 that may operate with other parts of the QIP system 800 (not shown) to perform quantum algorithms or quantum operations, including a stack or sequence of combinations of single qubit operations and/or multi-qubit operations (e.g., two-qubit operations) as well as extended quantum computations. As such, the algorithms component 810 may provide instructions to various components of the QIP system 800 (e.g., to the optical controller 820) to enable the implementation of the quantum algorithms or quantum operations.

The optical controller 820 may include an angle and position control system 845 based on the angle and position control system described above in connection with FIGS. 3-6. Accordingly, the angle and position control system 945 may include the input telescope 310 and the detector system 340. Although not shown, the angle and position control system 845 may include the Fourier lens 330 and/or the AOM 210, for example.

Figure 9:
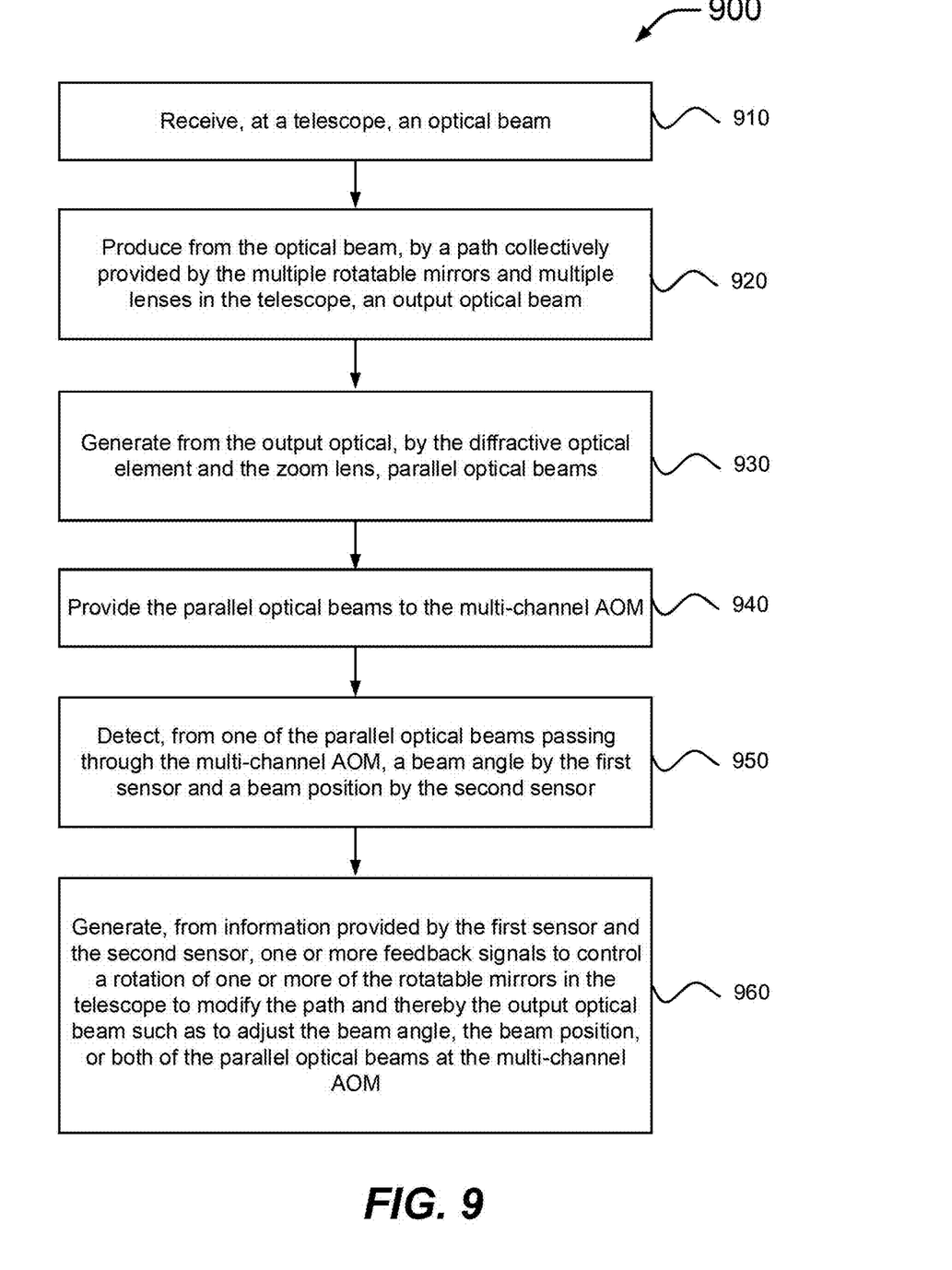
FIG. 9 is a flow diagram that illustrates an example of a method according to some aspects of the present disclosure.

FIG. 9 is a flow diagram that illustrates an example of a method 900 for controlling, by an optical beam control system (e.g., the angle and position control system 845), an optical beam in a QIP system in accordance with aspects of this disclosure. In an aspect, the functions of the method 900 may be performed by one or more components of a trapped ion system or a QIP system such as the QIP system 800 and its components (e.g., optical controller 820 and its components or subcomponents). Similarly, the functions of the method 900 may be performed by one or more components of a computer device such as the computer device 700 and its components. In an example, the optical beam control system may include one or more of a telescope (e.g., the input telescope 310) with multiple rotatable mirrors and multiple lenses, a diffractive optical lens (e.g., the DOE 320), a Fourier or zoom lens (e.g., the Fourier lens 330), a detector system (e.g., the detector system 340) having a first sensor and a second sensor, and a multi-channel AOM (e.g., the AOM 210).

At 910, the method 900 includes receiving, at the telescope, an optical beam.

At 920, the method 900 includes producing from the optical beam, by a path collectively provided by the multiple rotatable mirrors and multiple lenses in the telescope, an output optical beam.

At 930, the method 900 includes generating from the output optical, by the diffractive optical element and the zoom lens, parallel optical beams.

At 940, the method 900 includes providing the parallel optical beams to the multi-channel AOM.

At 950, the method 900 includes detecting, from one of the parallel optical beams passing through the multi-channel AOM, a beam angle by the first sensor and a beam position by the second sensor.

At 960, the method 900 includes generating, from information provided by the first sensor and the second sensor, one or more feedback signals to control a rotation of one or more of the rotatable mirrors in the telescope to modify the path and thereby the output optical beam such as to adjust the beam angle, the beam position, or both parallel optical beams at the multi-channel AOM.

In another aspect of the method 900, generating the one or more feedback signals includes generating a first feedback signal to control one of the rotatable mirrors to adjust the beam angle and generating a second feedback signal to control another one of the rotatable mirrors to adjust the beam position, wherein the adjustment of the beam angle is independent or orthogonal from the adjustment of the beam position.

In another aspect of the method 900, the telescope includes a piezo mirror mount for each of the rotatable mirrors, the method further comprising receiving at each piezo mirror mount a corresponding portion of the feedback signal to control the rotation of the respective rotatable mirror.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. An optical beam control system, comprising:
a telescope having multiple rotatable mirrors and multiple lenses collectively configured to provide a path to an optical beam that is input into the telescope to produce an output optical beam, the output optical beam being made into parallel optical beams following a diffractive optical element; and
a detector system configured to detect a beam angle, a beam position, or both associated with one of the parallel optical beams being sampled to generate one or more feedback signals to control a rotation of one or more of the rotatable mirrors in the telescope to modify the path and thereby the output optical beam such as to adjust the beam angle, the beam position, or both of the parallel optical beams;
wherein the parallel optical beams are provided to a multi-channel acousto-optic modulator (AOM) in a quantum information processing (QIP) system, the AOM being configured to adjust one or more of the parallel optical beams to control respective atomic qubits in the QIP system.

2. The optical beam control system of claim 1, wherein the one or more feedback signals include a first feedback signal to control one of the rotatable mirrors to adjust the beam angle and a second feedback signal to control another one of the rotatable mirrors to adjust the beam position, wherein the adjustment of the beam angle is independent or orthogonal from the adjustment of the beam position.

3. The optical beam control system of claim 1, wherein the detector system includes a first sensor configured to detect the beam angle of the one parallel optical beam, and a second sensor configured to detect the beam position of the one parallel optical beam.

4. The optical beam control system of claim 3, wherein the detector system includes multiple mirrors and multiple lenses collectively configured to direct the one parallel optical beam to the first sensor to detect the beam angle and to the second sensor to detect the beam position.

5. The optical beam control system of claim 3, wherein the detector system further comprises a controller configured to receive and process information from the first sensor, the second sensor, or both, to generate the feedback signal.

6. The optical beam control system of claim 1, wherein the rotatable mirrors include a first mirror configured to change a beam angle of the output optical beam incident on an imaging point of the telescope that coincides with the diffractive optical element, wherein the change of the beam angle corresponds to a lateral shift in the beam position of the one parallel optical beam.

7. The optical beam control system of claim 1, wherein the rotatable mirrors include a second mirror configured to change the beam angle of the parallel optical beams.

8. The optical beam control system of claim 1, wherein the path includes a first mirror, a first lens having a first focal length, a second mirror, and a second lens having a second focal length, the first mirror and the second mirror being positioned the first focal length away from the first lens, and the second mirror and the diffractive optical element being positioned the second focal length away from the second lens.

9. The optical beam control system of claim 1, wherein the one parallel optical beam is received by the detector system after passing through a respective channel in the multi-channel AOM.

10. The optical beam control system of claim 1, wherein the telescope includes a piezo mirror mount for each of the rotatable mirrors, each piezo mirror mount being configured to receive a corresponding portion of the feedback signal to control the rotation of the respective rotatable mirror.

11. A quantum information processing (QIP) system for controlling quantum states of ions in an ion chain for quantum operations, comprising:
a trap configured to implement the ion chain;
a multi-channel acousto-optic modulator (AOM) configured to receive multiple parallel optical beams and modify one or more of the parallel optical beams for controlling respective ions in the ion chain;
a telescope having multiple rotatable mirrors and multiple lenses collectively configured to provide a path to an optical beam that is input into the telescope to produce an output optical beam, the output optical beam being made into the parallel optical beams following a diffractive optical element; and
a detector system configured to detect a beam angle, a beam position, or both associated with one of the parallel optical beams being sampled to generate one or more feedback signals to control a rotation of one or more of the rotatable mirrors in the telescope to modify the path and thereby the output optical beam such as to adjust the beam angle, the beam position, or both of the parallel optical beams at the multi-channel AOM;
wherein the parallel optical beams are provided to the AOM in the QIP system, the AOM being configured to adjust one or more of the parallel optical beams to control respective atomic qubits in the QIP system.

12. The QIP system of claim 11, wherein the one or more feedback signals include a first feedback signal to control one of the rotatable mirrors to adjust the beam angle and a second feedback signal to control another one of the rotatable mirrors to adjust the beam position, wherein the adjustment of the beam angle is independent or orthogonal from the adjustment of the beam position.

13. The QIP system of claim 11, wherein the detector system includes a first sensor configured to detect the beam angle of the one parallel optical beam, and a second sensor configured to detect the beam position of the one parallel optical beam.

14. The QIP system of claim 11, wherein the detector system includes multiple mirrors and multiple lenses collectively configured to direct the one parallel optical beam to the first sensor to detect the beam angle and to the second sensor to detect the beam position.

15. The QIP system of claim 11, wherein the detector system further comprises a controller configured to receive and process information from the first sensor, the second sensor, or both, to generate the feedback signal.

16. The QIP system of claim 11, wherein the rotatable mirrors include a first mirror configured to change a beam angle of the output optical beam incident on an imaging point of the telescope that coincides with the diffractive optical element, wherein the change of the beam angle corresponds to a lateral shift in the beam position of the one parallel optical beam, and the rotatable mirrors include a second mirror configured to change the beam angle of the parallel optical beams at the multi-channel AOM.

17. A method for controlling, by an optical beam control system, an optical beam in a quantum information processing (QIP) system, the optical beam control system having a telescope with multiple rotatable mirrors and multiple lenses, a diffractive optical lens, a zoom lens, a detector system having a first sensor and a second sensor, and a multi-channel acousto-optic modulator (AOM), the method comprising:

receiving, at the telescope, an optical beam;

producing from the optical beam, by a path collectively provided by the multiple rotatable mirrors and multiple lenses in the telescope, an output optical beam;

generating from the output optical, by the diffractive optical element and the zoom lens, parallel optical beams;

providing the parallel optical beams to the multi-channel AOM;

detecting, from one of the parallel optical beams passing through the multi-channel AOM, a beam angle by the first sensor and a beam position by the second sensor; and generating, from information provided by the first sensor and the second sensor, one or more feedback signals to control a rotation of one or more of the rotatable mirrors in the telescope to modify the path and thereby the output optical beam such as to adjust the beam angle, the beam position, or both of the parallel optical beams at the multi-channel AOM;

wherein providing the parallel optical beams comprises adjusting one or more of the parallel optical beams to control respective atomic qubits in the QIP system.

18. The method of claim 17, wherein generating the one or more feedback signals includes generating a first feedback signal to control one of the rotatable mirrors to adjust the beam angle and generating a second feedback signal to control another one of the rotatable mirrors to adjust the beam position, wherein the adjustment of the beam angle is independent or orthogonal from the adjustment of the beam position.

19. The method of claim 17, wherein the telescope includes a piezo mirror mount for each of the rotatable mirrors, the method further comprising receiving at each piezo mirror mount a corresponding portion of the feedback signal to control the rotation of the respective rotatable mirror.

* * * * *